US009347506B2

(12) United States Patent
Kim (10) Patent No.: US 9,347,506 B2
(45) Date of Patent: May 24, 2016

(54) DISC BRAKE

(71) Applicant: MANDO CORPORATION, Pyeongtaek-si, Gyeonggi-do (KR)

(72) Inventor: A-Ram Kim, Seoul (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/698,492

(22) Filed: Apr. 28, 2015

(65) Prior Publication Data
US 2015/0308525 A1    Oct. 29, 2015

(30) Foreign Application Priority Data

Apr. 28, 2014    (KR) .......................... 10-2014-0050553

(51) Int. Cl.
*F16D 65/56* (2006.01)
*F16D 65/00* (2006.01)
*F16D 55/225* (2006.01)
(Continued)

(52) U.S. Cl.
CPC .......... *F16D 65/0068* (2013.01); *F16D 55/225* (2013.01); *F16D 65/58* (2013.01); *F16D 65/52* (2013.01); *F16D 65/543* (2013.01); *F16D 65/56* (2013.01); *F16D 65/567* (2013.01); *F16D 2055/0016* (2013.01); *F16D 2055/0029* (2013.01)

(58) Field of Classification Search
CPC ....... F16D 65/52; F16D 65/543; F16D 65/56; F16D 65/567; F16D 65/58
USPC .............................. 188/71.8, 71.9, 72.4, 72.6
See application file for complete search history.

(56) References Cited

U.S. PATENT DOCUMENTS 4,784,245 A * 11/1988 Fabbro .................. F16D 65/567
188/196 D
5,586,623 A * 12/1996 Mery ...................... F16D 65/18
188/72.6
(Continued)

FOREIGN PATENT DOCUMENTS

KR    10-2013-0086438 A    8/2013

*Primary Examiner* — Thomas Irvin
(74) *Attorney, Agent, or Firm* — McDermott Will & Emery LLP (57) ABSTRACT

Disclosed herein is a disc brake. The disc brake which has a carrier in which a pair of pad plates are installed retractably and a caliper housing having a cylinder that is slidably installed in the carrier and in which a piston is installed retractably by a braking hydraulic pressure includes an adjuster that is installed inside the piston to prevent the pad plate from being away from the disc and maintain a predetermined running clearance between the disc and the pad plate, a push rod whose front portion is screwed to the adjuster and whose rear portion extends toward an inner circumferential surface of the cylinder so that rotation is prevented, and that includes a flange portion installed inside the cylinder, a ramp that is disposed on a front side of the flange portion, and in which a first elastic member for providing an elastic force to the push rod is integrally provided, a spring case whose one end is fixed to the cylinder, and that forms a predetermined accommodating space between the inner circumferential surface of the cylinder and the push rod, and a second elastic member that is provided in the accommodating space of the spring case to provide an elastic force to the ramp and the push rod. Here, the first and second elastic members are arranged in series, and the first elastic member is bent so that a part of the ramp is elastically deformed.

14 Claims, 5 Drawing Sheets

(51) Int. Cl.
  *F16D 65/58*  (2006.01)
  *F16D 65/52*  (2006.01)
  *F16D 65/54*  (2006.01)
  *F16D 55/00*  (2006.01)

(56) References Cited

U.S. PATENT DOCUMENTS

| | | | | |
|---|---|---|---|---|
| 5,609,227 A * | 3/1997 | Mery | ............ | F16D 65/18 188/72.6 |
| 5,868,225 A * | 2/1999 | Hulliger | ............ | F16D 65/567 188/71.9 |
| 6,478,120 B2 * | 11/2002 | Runkel | ............ | F16D 65/18 188/196 D |
| 6,651,784 B1 * | 11/2003 | Barbosa | ............ | F16D 65/18 188/71.9 |
| 6,749,044 B2 * | 6/2004 | Boisseau | ............ | F16D 65/18 188/72.7 |
| 6,811,002 B2 * | 11/2004 | Nakayama | ............ | F16D 65/18 188/71.9 |
| 7,331,432 B2 * | 2/2008 | Watada | ............ | F16D 65/18 188/72.7 |
| 7,523,815 B2 * | 4/2009 | Petri | ............ | F16C 17/08 188/71.9 |
| 8,069,961 B2 * | 12/2011 | Watada | ............ | F16D 65/18 188/71.9 |
| 8,177,038 B2 * | 5/2012 | Watada | ............ | F16D 65/18 188/71.8 |
| 8,668,057 B2 * | 3/2014 | Kim | ............ | F16D 65/18 188/72.9 |
| 8,881,874 B2 * | 11/2014 | Kong | ............ | F16D 65/18 188/71.8 |
| 8,936,137 B2 * | 1/2015 | Yoshikawa | ............ | F16D 65/18 188/71.9 |
| 8,973,718 B2 * | 3/2015 | Kong | ............ | F16D 65/18 188/71.9 |
| 9,163,684 B2 * | 10/2015 | Hong | ............ | F16D 65/543 |
| 9,175,738 B2 * | 11/2015 | Hong | ............ | F16D 55/226 |
| 2011/0155520 A1 * | 6/2011 | Takahashi | ............ | F16D 65/18 188/72.6 |
| 2015/0053512 A1 * | 2/2015 | Lee | ............ | F16D 65/38 188/72.3 |

* cited by examiner

DISC BRAKE

CROSS-REFERENCE TO RELATED APPLICATION

This application claims the benefit of Korean Patent Application No. 2014-0050553, filed on Apr. 28, 2014 in the Korean Intellectual Property Office, the disclosure of which is incorporated herein by reference.

BACKGROUND

1. Field

Embodiments of the present invention relate to a disc brake, and more particularly, to a disc brake that may reliably return a piston when a braking operation is completed and improve a return effect.

2. Description of the Related Art

In general, a disc brake is a device that stops rotation of a disc by forcibly pressing a friction pad onto both surfaces of the disc that is rotated together with wheels of a vehicle, and thereby may brake the vehicle.

For such a disc brake, a method of retracting a piston using a sealing member and a roll-back chamfer in order to reduce a drag phenomenon in which the disc and the friction pad are continuously rubbed after the braking operation, and a method of forcibly retracting the piston together with a pad plate for pressing the disc by installing a pressure spring in the pad plate are used. However, when using the sealing member and the roll-back chamfer for a long time, durability of the sealing member is reduced so that retraction of the piston does not occur smoothly, and a drag phenomenon is generated by a back slip phenomenon. In addition, when using the pressure spring, a running clearance between the disc and the pad plate is increased by the abrasion of the friction pad mounted in the pad plate by forcibly returning the pad plate and the piston to its original position, and therefore a brake feeling is changed.

Thus, in recent years, a disc brake that reliably returns the piston to its original position while maintaining the running clearance between the disc and the pad plate even though the friction pad is worn has been proposed. In particular, in Korean Patent Publication No. 10-2013-0086438, a disc brake that can ensure a predetermined running clearance between the disc and the pad plate in an early stage of braking is disclosed. In the disclosed disc brake, an adjuster is provided to maintain the running clearance between the disc and the pad plate constant, and a low pressure spring that acts according to a low pressure and a high pressure spring that acts according to a high pressure are arranged in parallel for a smooth return of the piston and the pad plate to retract the piston, and thereby may prevent drag and ensure the running clearance between the disc and the pad plate.

However, there are problems that the volume of the disc brake is increased so as to ensure a mounting space for installing the two springs when the low pressure spring and the high pressure spring are arranged in parallel, and manufacturing costs are increased due to an increase in the number of parts.

PRIOR ART DOCUMENT

Patent Document (Patent Document) Korean Patent Publication No. 10-2013-0086438 (Mando Co.) 8.2.2013

SUMMARY

Therefore, it is an aspect of the present invention to provide a disc brake in which a low pressure spring and a high pressure spring may be arranged in series to minimize the whole length of the disc brake and an elastic force may be provided through a change in the structure of a ramp to remove a separate elastic member, and therefore it is possible to reduce the number of parts and reduce material costs.

Additional aspects of the invention will be set forth in part in the description which follows and, in part, will be obvious from the description, or may be learned by practice of the invention.

In accordance with one aspect of the present invention, a disc brake which has a carrier in which a pair of pad plates are installed retractably and a caliper housing having a cylinder that is slidably installed in the carrier and in which a piston is installed retractably by a braking hydraulic pressure, the disc brake includes: an adjuster that is installed inside the piston to prevent the pad plate from being away from the disc and maintain a predetermined running clearance between the disc and the pad plate; a push rod whose front portion is screwed to the adjuster and whose rear portion extends toward an inner circumferential surface of the cylinder so that rotation is prevented, and that includes a flange portion installed inside the cylinder; a ramp that is disposed on a front side of the flange portion, and in which a first elastic member for providing an elastic force to the push rod is integrally provided; a spring case whose one end is fixed to the cylinder, and that forms a predetermined accommodating space between the inner circumferential surface of the cylinder and the push rod; and a second elastic member that is provided in the accommodating space of the spring case to provide an elastic force to the ramp and the push rod, wherein the first and second elastic members are arranged in series, and the first elastic member is bent so that a part of the ramp is elastically deformed.

Here, one end of the second elastic member may be supported by one side surface of the spring case and the other end thereof may be supported by the ramp so that an elastic force is provided in a movement direction of the piston, and the elastic force of the first elastic member may be smaller than the elastic force of the second elastic member.

Also, a rear wall of the cylinder may be formed to be stepped, and a seating groove on which the flange portion of the push rod is seated and an end jaw portion may be provided on the rear wall of the cylinder.

Also, the ramp may include a cylindrical body portion in which a through-hole through which the front portion of the push rod passes is formed in a center thereof, and that is bent to have a support surface for supporting the other end of the second elastic member in a periphery of the through-hole, a ring-shaped support plate that extends radially from the body portion and is supported by the end jaw portion, and the first elastic member that is bent so that a part of the body portion is cut to be brought into contact with the flange portion.

Also, a distal end surface of the end jaw portion on which the support plate is seated may protrude in a forward direction of the piston from a distal end surface of the flange portion seated on the seating groove, so that a gap is formed between the support plate and the flange portion.

Also, a rotation preventing protrusion that protrudes outward may be formed on an outer peripheral surface of the flange portion or a rear surface of the flange portion, and in the cylinder, a rotation preventing groove coupled to the rotation preventing protrusion may be formed in a position corresponding to the rotation preventing protrusion.

Also, the adjuster may include a head portion that is brought into contact with the piston and a rod that extends rearward from the head portion and has a thread on an outer circumferential surface of the rod so that the rod is screwed to the push rod, a washer may be installed in each of a rear wall of the head portion of the adjuster and an inner surface of the piston, and a washer spring may be provided between the washers so that the adjuster is closely adhered to the piston by an elastic force of the washer spring.

Also, a hydraulic duct that receives a braking hydraulic pressure for pressing the piston may be formed in one end of the caliper housing.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general dictionary meanings, but interpreted based on the meanings and concepts corresponding to technical aspects of the present disclosure on the basis of the principle that the inventor is allowed to define terms appropriately for the best explanation. Therefore, the description proposed herein is merely a preferable example for the purpose of illustration only, not intended to limit the scope of the disclosure, and thus it should be understood that other equivalents and modifications could be made thereto without departing from the spirit and scope of the disclosure.

Figure 1:
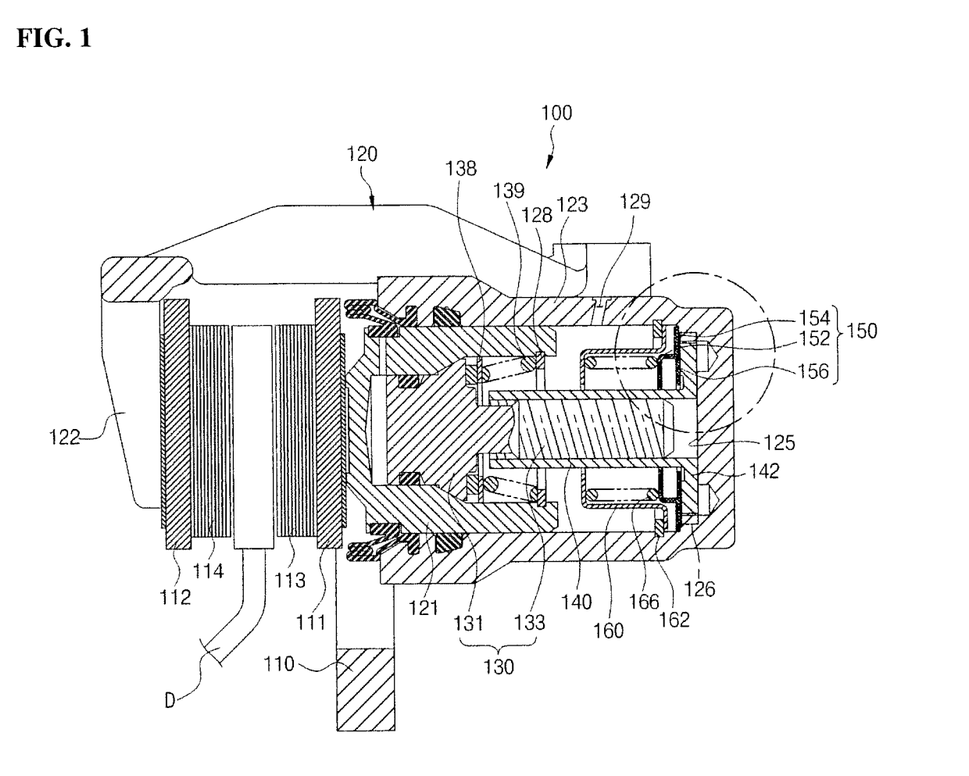
FIG. 1 is a cross-sectional view showing a disc brake according to a preferred embodiment of the present invention.
Figure 2:
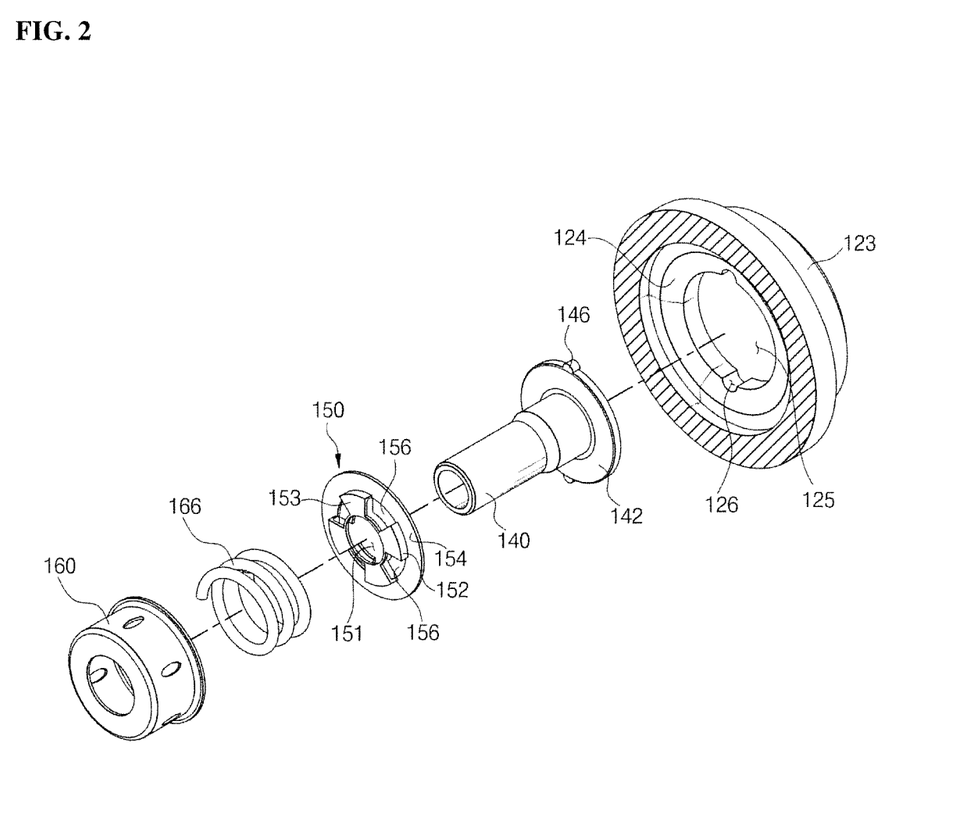
FIG. 2 is a partially enlarged view showing a state in which a gap between a push rod and a support plate provided in a disc brake according to a preferred embodiment of the present invention is generated.
Figure 3:
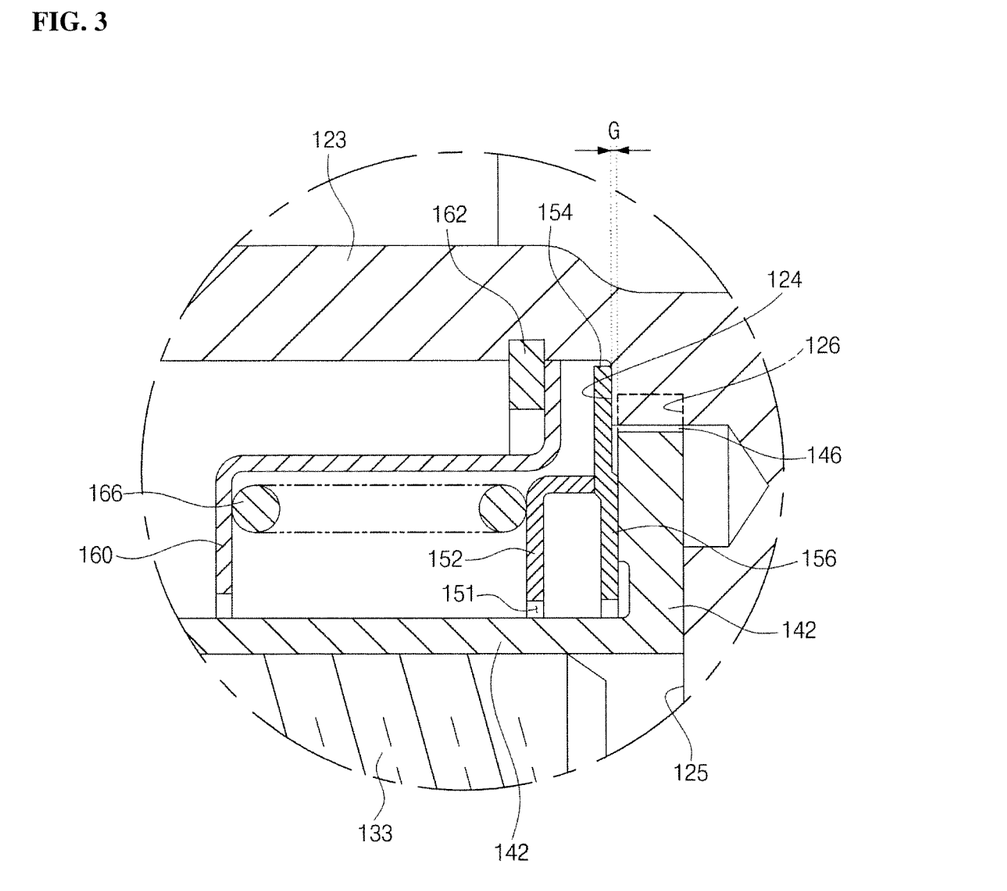
FIG. 3 is a partial perspective view showing a state in which a push rod provided in a disc brake according to a preferred embodiment of the present invention, a first elastic member, a second elastic member, and a ramp unit are installed.

FIG. 1 is a cross-sectional view showing a disc brake according to a preferred embodiment of the present invention, FIG. 2 is a partially enlarged view showing a state in which a gap between a push rod and a support plate provided in a disc brake according to a preferred embodiment of the present invention is generated, and FIG. 3 is a partial perspective view showing a state in which a push rod provided in a disc brake according to a preferred embodiment of the present invention, a first elastic member, a second elastic member, and a ramp unit are installed.

Referring to FIGS. 1 to 3, a disc brake 100 includes a caliper housing 120 in which a piston 121 is moved forward and backward by a braking hydraulic pressure is installed, a carrier 110 that is fixed to a body of a vehicle and to which the caliper housing 120 is slidably coupled, a pair of pad plates 111 and 112 which are installed in the carrier 110 so as to be slidable on a disc D while being spaced apart from each other by a predetermined running clearance so that the disc D rotated together with wheels (not shown) is pressed, an adjuster 130 that prevents the pad plates 111 and 112 from being away from the disc D and maintains a predetermined running clearance between the pad plates 111 and 112 and the disc D, a push rod 140 that is screwed to the adjuster 130 and is installed in a cylinder 123 of the caliper housing 120 so that rotation is prevented, a ramp 150 that is disposed on a front side of a flange portion 142 of the push rod 140 and in which a first elastic member 156 for providing an elastic force to the push rod 140 is integrally provided, a spring case 160 that forms a predetermined accommodating space between an inner circumferential surface of the cylinder 123 and the push rod 140, and a second elastic member 166 that is provided in the spring case 160.

The carrier 110 is fixed to a knuckle of the body of the vehicle via a mounting bolt (not shown), and the caliper housing 120 is slidably fastened to both ends of the carrier 110 through a guide rod (not shown). In addition, in a center portion of the carrier 110, the pair of pad plates 111 and 112 are slidably mounted in a direction facing each other while being spaced apart from each other by the predetermined running clearance.

The pair of pad plates 111 and 112 are arranged to be brought into contact with the piston 121 which will be described later, and include the inner pad plate 111 in which a friction pad 113 is attached to an inner surface thereof and the outer pad plate 112 that is disposed so as to be brought into contact with a finger portion 122 which will be described later and in which a friction pad 114 is attached to an inner surface thereof. In this instance, the disc D is formed into a disc shape which is rotated together with the wheels (not shown) of the vehicle, and a part of the disc D is rotated while being inserted between the pair of pad plates 111 and 112.

The caliper housing 120 includes the finger portion 122 for operating the outer pad plate 112, and the cylinder 123 in which the piston 121 is installed in such a manner that the piston 121 is slidable by the braking hydraulic pressure. In this instance, a hydraulic port 129 is formed in one end of the caliper housing 120 so that the braking hydraulic pressure can be supplied to the cylinder 123.

The finger portion 122 is molded to be bent downward from a front side of the caliper housing 120 so as to surround the outer pad plate 112 from the outside. Thus, when the caliper housing 120 is slidably moved to a right side from the carrier 110 by a reaction force according to movement of the piston 121 in a braking action, the outer pad plate 112 is pushed toward the disc D by the finger portion 122 to press the disc D.

The cylinder 123 is formed on a rear side of the caliper housing 120 so that a braking hydraulic pressure formed in a master cylinder (not shown) can be transmitted to the cylinder 123, and the piston 121 is installed in the cylinder 123 so as to be moved forward and backward. That is, the piston 121 installed in the cylinder 123 is moved forward and backward inside the cylinder 123 by the braking hydraulic pressure. In such a cylinder 123, the adjuster 130, the push rod 140, and the ramp 150 which will be described later together with the piston 121 are installed.

The piston 121 is provided in the form of a cup with an opened one side, and a head portion 131 of the adjuster 130 which will be described later is inserted into and brought into contact with an inner center portion of the piston 121.

The adjuster 130 includes the head portion 131 that is installed inside the piston 121 inserted into the cylinder 123 to be brought into contact with the piston 121 and a rod 133 that extends from the head portion 131 and has a thread on an outer circumferential surface of the rod. In this instance, as described above, the head portion 131 is inserted into the piston 121 through the opened side of the piston 121 and brought into contact with the piston 121.

Such an adjuster 130 prevents the disc D and the pad plates 111 and 112 from being away from each other due to the abrasion of the friction pads 113 and 114 attached to the pair of pad plates 111 and 112, and maintains the predetermined running clearance between the disc D and the pad plates 111 and 112. Here, washers 128 and 138 are installed on an inner surface of the piston 121 and a rear wall of the head portion 131, and a washer spring 139 is provided between the washers 128 and 138. That is, the adjuster 130 is provided in a state of being brought into contact with the piston 121 by an elastic force of the washer spring 139 installed between the inner surface of the piston 121 and the head portion 131. Thus, the washer spring 139 presses the adjuster 130 toward a distal end of the piston 121 so that the friction pads 113 and 114 of the pad plates 111 and 112 are worn by friction with the disc D, and therefore the adjuster 130 and the piston 121 are always brought into contact with each other even though the piston 121 is moved toward the inner pad plate 111.

The push rod 140 installed inside the cylinder 123 is screwed to the rear side of the adjuster 130, that is, the rod 133. Thus, when the piston 121 is moved forward by the braking hydraulic pressure, the adjuster 130 coupled to the piston 121 is also moved forward, and in this instance, the push rod 140 screwed to the adjuster 130 is also moved forward. Thus, the adjuster 130 and the push rod 140 are formed in such a manner that the spacing between the screwed threads can be reduced. That is, there is generally the space between the threads of the adjuster 130 and the push rod 140, but the adjuster 130 is in a pressurized state in a forward direction (left side) of the piston 121, and therefore the adjuster 130 and the push rod 140 are simultaneously moved by reducing the space between the threads.

The push rod 140 has a hollow center portion so that the front side of the push rod 140 can be screwed to the adjuster 130, a thread is formed on an inner circumferential surface of the push rod 140, and the flange portion 142 that extends toward the inner circumferential surface of the cylinder 123 is provided on a rear side of the push rod 140. Such a push rod 140 is provided while rotation of the push rod 140 is restricted. For example, a rotation preventing protrusion 146 that protrudes outward is formed on an outer peripheral surface of the flange portion 142 of the push rod 140, and a rotation preventing groove 126 coupled to the rotation preventing protrusion 146 is formed in a position corresponding to the rotation preventing protrusion 146. That is, the rotation preventing protrusion 146 is inserted into and coupled to the rotation preventing groove 126, and therefore rotation of the push rod 140 is prevented. In this instance, a case in which the rotation preventing protrusion 146 is formed on the outer peripheral surface of the flange portion 142 of the push rod 140 has been described, but the present invention is not limited thereto. For example, the rotation preventing protrusion 146 may be formed on the rear side of the flange portion 142 and the rotation preventing groove 126 coupled to the rotation preventing protrusion 146 may be formed in the position corresponding to the rotation preventing protrusion 146, that is, on the rear wall of the cylinder 123, so that the rotation of the push rod 140 may be restricted.

Meanwhile, the push rod 140 is screwed to the adjuster 130 while the rotation of the push rod 140 is prevented, and therefore the adjuster 130 may be moved in a longitudinal direction of the push rod 140. That is, the friction pads 113 and 114 are worn, and the adjuster 130 is rotated from the push rod 140 and moved by a movement distance of the piston 121 due to the property of the adjuster 130 to be closely adhered to the piston 121 by the washer spring 139 when the piston 121 is moved, and therefore a state in which the adjuster 130 is closely adhered to the piston 121 is maintained. Thus, the spacing between the pad plates 111 and 112 pressed by the disc D and the piston 121 is maintained to be constant.

The flange portion 142 of such a push rod 140 is seated on a seating groove 125 formed on the cylinder 123. More specifically, the rear wall of the cylinder 123 includes an end jaw portion 124 formed to be stepped and the seating groove 125 recessed toward the rear side of the cylinder 123 from the end jaw portion 124. In this instance, the above-described rotation preventing groove 126 is formed on the seating groove 125.

The ramp 150 includes a body portion 152 in which a through-hole 151 through which the front side of the push rod 140 passes is formed in a center thereof, a support plate 154 that extends radially from the body portion 152, and the first elastic member 156 that is bent so that a part of the body portion 152 is cut to be brought into contact with the flange portion 142.

The body portion 152 is provided in the form of a cylinder that is bent so as to have a support surface 153 for supporting the other end of the second elastic member 166 formed in a periphery of the through-hole 151. The support plate 154 that extends from an end portion of such a body portion 152 has a ring shape and is supported by the end jaw portion 124 of the cylinder 123.

The first elastic member 156 is bent to be brought into contact with the flange portion 142 in such a manner that the ramp 150, that is, a part of the body portion 152 is cut so as to be elastically deformed. That is, the first elastic member 156 is provided so as to be brought into contact with the flange portion 142 of the push rod 140, thereby providing an elastic force to the push rod 140. Such a first elastic member 156 is integrally formed with the body portion 152. In addition, the first elastic member 156 may be bent in such a manner that a part of the first elastic member 156 extends from the support plate 154 to provide an elastic force to the flange portion 142.

In this instance, a distal end surface of the end jaw portion 124 on which the support plate 154 is seated is formed to protrude in a forward direction of the piston 121 from a distal end surface of the flange portion 142 seated on the seating groove 125. Thus, a gap G is formed between the support plate 154 and the flange portion 142. This is to ensure the running clearance between the disc D and the pad plates 111 and 112.

The spring case 160 is provided to form a predetermined accommodating space between the push rod 140 and the inner circumferential surface of the cylinder 123. Specifically, one end of the spring case 160 is fixed to the inner circumferential surface of the cylinder 123 by a snap ring 162, and the second elastic member 166 that returns the piston 121 by returning the push rod 140 and the ramp 150 to their original positions is provided in the spring case 160. In this instance, the one end of the second elastic member 166 is supported by the spring case 160, and the other end thereof is supported by the support surface 153 of the body portion 152, thereby providing an elastic force to the ramp 150 and the push rod 140.

Meanwhile, the first elastic member 156 is bent from the body portion 152 to provide the elastic force to the flange portion 142, and therefore the first and second elastic members 156 and 166 may be arranged in series. The first elastic member 156 is cut from the body portion 152 to be bent even though the first and second elastic members 156 and 166 are arranged in series, and therefore an increase in the whole length of the disc brake 100 may be minimized and the number of parts may be reduced to reduce costs because a separate spring is not installed compared to the prior art.

Such first and second elastic members 156 and 166 may be provided to have a different elastic force from each other, and for example, the second elastic member 166 may have a relatively larger elastic force than that of the first elastic member 156. Thus, the first elastic member 156 is primarily pressed and compressed, and then the second elastic member 166 is secondarily compressed to provide an elastic force.

Figure 4:
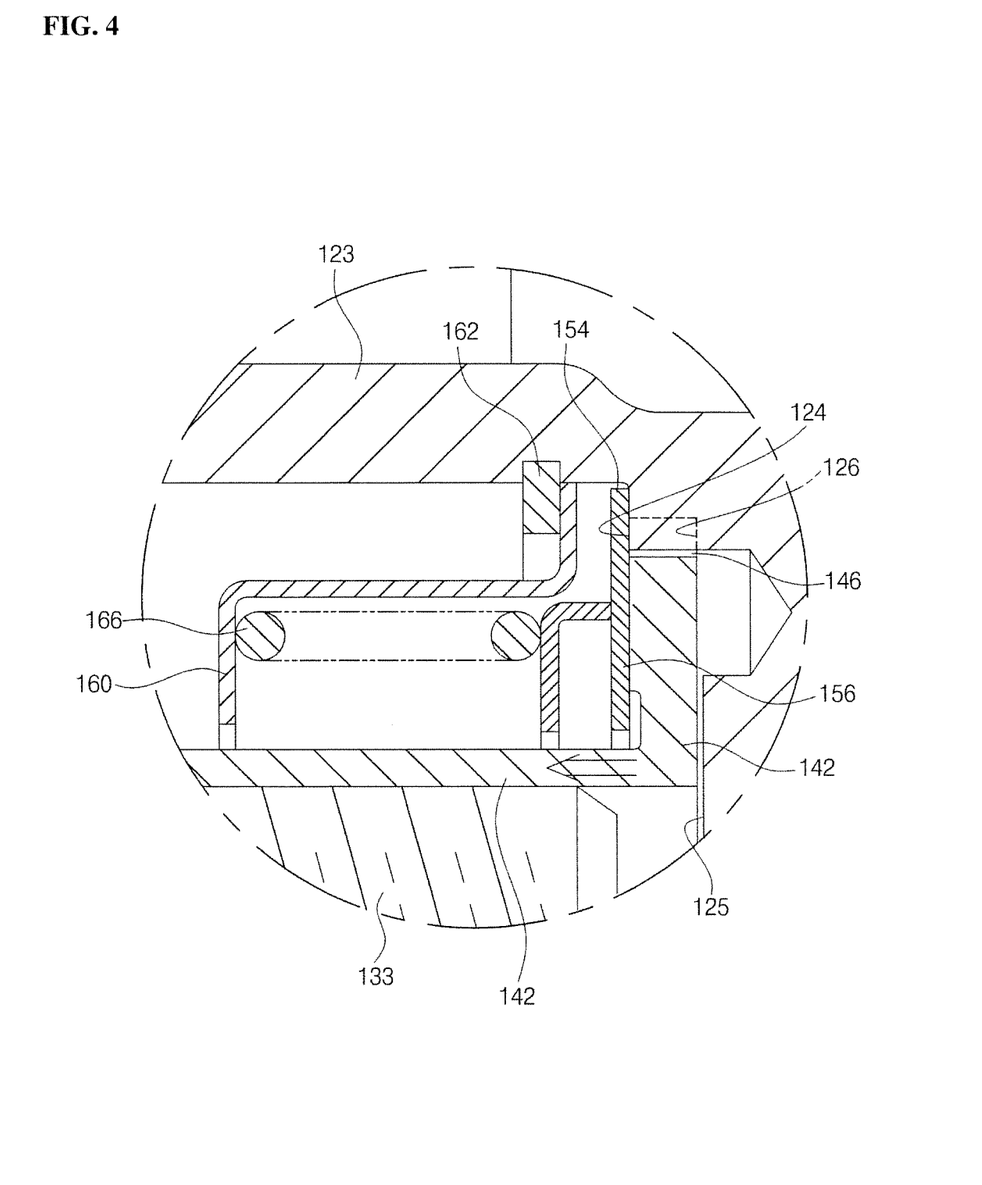
FIGS. 4 and 5 are views showing an operation state of a disc brake according to a preferred embodiment of the present invention.
Figure 5:
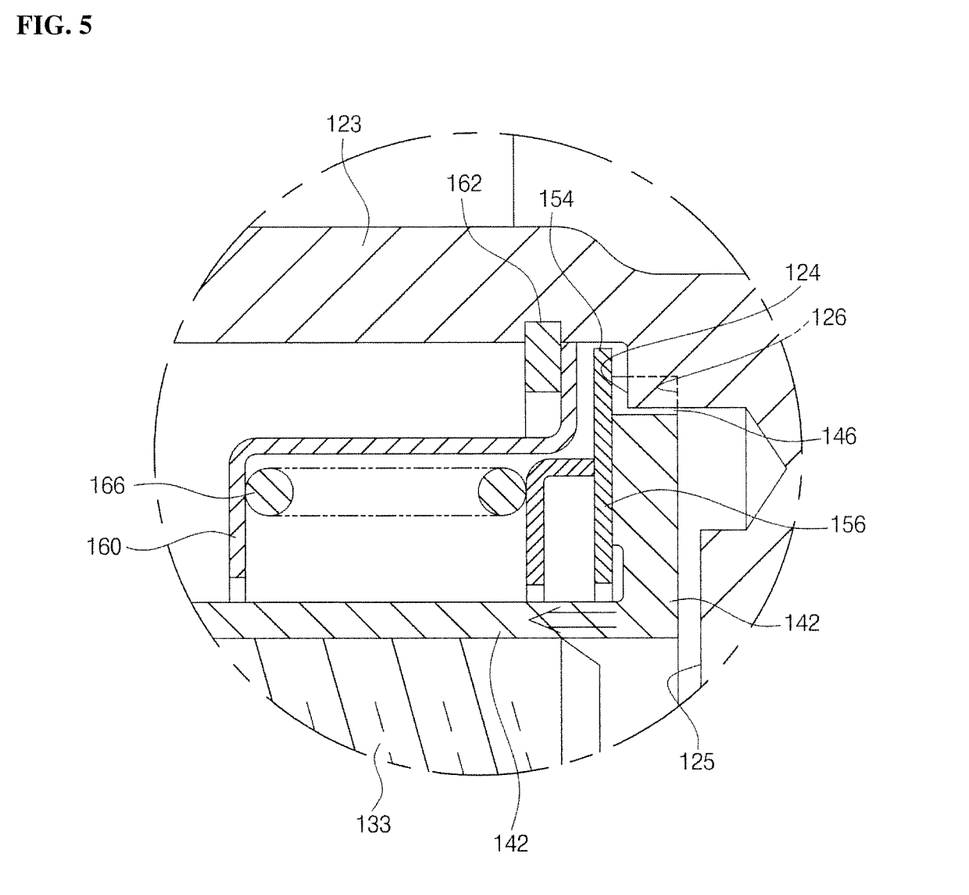

By the structure that supports the first elastic member 156 and the second elastic member 166, the first elastic member 156 is brought into contact with the flange portion 142 and supported before the disc brake 100 is operated, and the second elastic member 166 is supported by the body portion 152 of the ramp 150 inside the spring case 160. In addition, when the adjuster 130 and the push rod 140 are moved according to the movement of the piston 121 in the braking action, the first elastic member 156 supported by the flange portion 142 of the push rod 140 is first compressed by the gap G between the flange portion 142 and the support plate 154 as shown in FIG. 4, and after the first elastic member 156 is compressed by the gap G, the flange portion 142 is brought into contact with the support plate 154 to be moved together with the support plate 154 as shown in FIG. 5. That is, when the body portion 152 integrally formed with the support plate 154 is moved, the first elastic member 156 and the second elastic member 166 are compressed together. This is because the second elastic member 166 has the relatively larger elastic force than that of the first elastic member 156.

Next, an operation state of the above-described disc brake 100 will be described.

First, when the disc brake 100 according to the present invention is installed in a vehicle, a gap G is formed between the flange portion 142 of the push rod 140 and the support plate 154 of the ramp 150, thereby ensuring a running clearance between the disc D and the pad plates 111 and 112.

In this state, a braking hydraulic pressure is introduced into the cylinder 123 through the hydraulic port 129 in the braking action, and the piston 121 presses the inner pad plate 111 so that the friction pad 113 attached to the inner pad plate 111 presses the disc D, and at the same time, the caliper housing 120 is slidable from the carrier 110 by a reaction force. Next, the finger portion 122 presses the outer pad plate 112 so that the friction pad 114 attached to the outer pad plate 112 compresses the disc D to generate a braking force.

In this instance, when the piston 121 is moved, the adjuster 130 that is brought into contact with the piston 121 and the push rod 140 that is coupled to the adjuster 130 are moved together. More specifically, only the first elastic member 156 supported by the flange portion 142 is compressed when the push rod 140 is moved. That is, as shown in FIG. 4, the push rod 140 is moved by the gap G between the flange portion 142 of the push rod 140 and the support plate 154, thereby compressing the first elastic member 156. In addition, when the push rod 140 is moved by the gap G, the flange portion 142 is brought into contact with the support plate 154, whereby the push rod 140 and the support plate 154 are moved together (see FIG. 5). That is, the body portion 152 integrally formed with the support plate 154 is moved together to compress the second elastic member 166 supported by the body portion 152, thereby compressing the first elastic member 156 and the second elastic member 166 together. Here, when the push rod 140 is moved, the rotation preventing protrusion 146 formed in the flange portion 142 is coupled to the rotation preventing groove 126 so that rotation of the push rod 140 is restricted, and is guided from the rotation preventing groove 126 to be moved.

As described above, the first and second elastic members 156 and 166 are arranged in series, the first elastic member 156 is provided as a low pressure spring having a relatively lower elastic force than that of the second elastic member 166, and the second elastic member 166 is provided as a high pressure spring having a relatively larger elastic force than that of the first elastic member 156, and therefore the first and second elastic members 156 and 166 may be operated according to a low pressure and a high pressure in the braking action. That is, the push rod 140 is moved by compressing the first elastic member 156 only by the gap G at the time of the low pressure, and is moved by compressing the first elastic member 156 at the time of the high pressure and moved so as to compress the second elastic member 166 in conjunction with the ramp 150.

The push rod 140 and the ramp 150 are returned to their original positions by the second elastic member 166 and the first elastic member 156 after the braking is completed, and therefore the piston 121 is smoothly retracted without drag. In this instance, when the support plate 154 of the ramp 150 is brought into contact with the end jaw portion 124 of the cylinder 123 by the second elastic member 166, the push rod 140 is finally returned to its original position by the gap G by the first elastic member 156. In addition, the adjuster 130 and the piston 121 which are screwed to the push rod 140 are also returned to their original positions, thereby improving the return effect of the piston 121. Thus, an initial running clearance between the disc D and the friction pads 113 and 114 may be maintained. In addition, when the abrasion of the friction pads 113 and 114 occurs due to braking, the running clearance between the disc D and the pad plates 111 and 112, that is, between the disc D and the friction pads 113 and 114 may be automatically adjusted by the adjuster 130.

As is apparent from the above description, according to the disc brake in accordance with one embodiment of the present invention, the low pressure spring that acts according to a low pressure and the high pressure spring that acts according to a high pressure at the time of braking may be respectively provided to retract the piston, thereby preventing drag. In addition, the low pressure spring and the high pressure spring may be arranged in series, thereby minimizing the whole length of the disc brake.

In addition, a part of the ramp may be cut and the cut part may function as the low pressure spring, and therefore an existing separate elastic member may be removed to reduce the number of parts, and material costs may be reduced.

In addition, the ramp may be installed so as to be spaced apart from the push rod, thereby ensuring the running clearance between the disc and the pad plates. Thus, the abrasion of the friction pad that occurs when the friction pad is unnecessarily rubbed with the disc and noise due to the abrasion may be prevented, and a smooth braking force may be attained.

Meanwhile, the adjuster may be provided to maintain the running clearance between the disc and the pad plates constant, and therefore an amount of roll back due to the abrasion of the friction pad that presses the disc may be increased, thereby preventing a reduction in a brake feeling in an early stage of braking.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A disc brake which has a carrier in which a pair of pad plates are installed retractably and a caliper housing having a cylinder that is slidably installed in the carrier and in which a piston is installed retractably by a braking hydraulic pressure, the disc brake comprising:

an adjuster that is installed inside the piston to prevent the pad plate from being away from the disc and maintain a predetermined running clearance between the disc and the pad plate;

a push rod whose front portion is screwed to the adjuster and whose rear portion extends toward an inner circumferential surface of the cylinder so that rotation is prevented, and that includes a flange portion installed inside the cylinder;

a ramp that is disposed on a front side of the flange portion, and in which a first elastic member for providing an elastic force to the push rod is integrally provided;

a spring case whose one end is fixed to the cylinder, and that forms a predetermined accommodating space between the inner circumferential surface of the cylinder and the push rod; and a second elastic member that is provided in the accommodating space of the spring case to provide an elastic force to the ramp and the push rod, wherein the first and second elastic members are arranged in series, and the first elastic member is bent so that a part of the ramp is elastically deformed.

2. The disc brake according to claim 1, wherein one end of the second elastic member is supported by one side surface of the spring case and the other end thereof is supported by the ramp so that an elastic force is provided in a movement direction of the piston, and the elastic force of the first elastic member is smaller than the elastic force of the second elastic member.

3. The disc brake according to claim 2, wherein a hydraulic duct that receives a braking hydraulic pressure for pressing the piston is formed in one end of the caliper housing.

4. The disc brake according to claim 1, wherein a rear wall of the cylinder is formed to be stepped, and a seating groove on which the flange portion of the push rod is seated and an end jaw portion are provided on the rear wall of the cylinder.

5. The disc brake according to claim 4, wherein a hydraulic duct that receives a braking hydraulic pressure for pressing the piston is formed in one end of the caliper housing.

6. The disc brake according to claim 4, wherein the ramp includes a cylindrical body portion in which a through-hole through which the front portion of the push rod passes is formed in a center thereof, and that is bent to have a support surface for supporting the other end of the second elastic member in a periphery of the through-hole, a ring-shaped support plate that extends radially from the body portion and is supported by the end jaw portion, and the first elastic member that is bent so that a part of the body portion is cut to be brought into contact with the flange portion.

7. The disc brake according to claim 6, wherein a hydraulic duct that receives a braking hydraulic pressure for pressing the piston is formed in one end of the caliper housing.

8. The disc brake according to claim 6, wherein a distal end surface of the end jaw portion on which the support plate is seated protrudes in a forward direction of the piston from a distal end surface of the flange portion seated on the seating groove, so that a gap is formed between the support plate and the flange portion.

9. The disc brake according to claim 8, wherein a hydraulic duct that receives a braking hydraulic pressure for pressing the piston is formed in one end of the caliper housing.

10. The disc brake according to claim 1, wherein a rotation preventing protrusion that protrudes outward is formed on an outer peripheral surface of the flange portion or a rear surface of the flange portion, and in the cylinder, a rotation preventing groove coupled to the rotation preventing protrusion is formed in a position corresponding to the rotation preventing protrusion.

11. The disc brake according to claim 10, wherein a hydraulic duct that receives a braking hydraulic pressure for pressing the piston is formed in one end of the caliper housing.

12. The disc brake according to claim 1, wherein the adjuster includes a head portion that is brought into contact with the piston and a rod that extends rearward from the head portion and has a thread on an outer circumferential surface of the rod so that the rod is screwed to the push rod, a washer is installed in each of a rear wall of the head portion of the adjuster and an inner surface of the piston, and a washer spring is provided between the washers so that the adjuster is closely adhered to the piston by an elastic force of the washer spring.

13. The disc brake according to claim 12, wherein a hydraulic duct that receives a braking hydraulic pressure for pressing the piston is formed in one end of the caliper housing.

14. The disc brake according to claim 1, wherein a hydraulic duct that receives a braking hydraulic pressure for pressing the piston is formed in one end of the caliper housing.

* * * * *